(12) United States Patent
Bella et al.

(10) Patent No.: US 6,176,475 B1
(45) Date of Patent: Jan. 23, 2001

(54) AIR DAMPER WITH ADJUSTABLE AIR FLOW RATE

(75) Inventors: Joseph J. Bella, Wheaton; Steven L. Bivens, Kankakee; Lisa E. Chisholm, Prospect Heights; Gary R. Little, St. Charles, all of IL (US)

(73) Assignee: Illinois Tool Works Inc., Glenview, IL (US)

( * ) Notice: Under 35 U.S.C. 154(b), the term of this patent shall be extended for 0 days.

(21) Appl. No.: 09/436,797

(22) Filed: Nov. 8, 1999

(51) Int. Cl.⁷ .................................................. F16F 5/00
(52) U.S. Cl. ................... 267/120; 188/322.22; 267/64.11
(58) Field of Search ...................... 188/322.16–322.19, 188/322.22, 288, 300; 267/64.12, 120, 124; 277/29, 70, 71, 73, 165, 177; 16/66, 8

(56) References Cited

U.S. PATENT DOCUMENTS

| | | | |
|---|---|---|---|
| 4,877,155 | 10/1989 | Tull | 222/108 |
| 5,085,397 | 2/1992 | Henkel | 248/688 |
| 5,183,137 | 2/1993 | Siwek et al. | 188/381 |
| 5,257,680 | 11/1993 | Corcoran et al. | 188/129 |
| 5,295,564 | 3/1994 | Stadelmann | 188/381 |
| 5,603,574 | 2/1997 | Ide et al. | 384/117 |
| 5,647,578 | 7/1997 | Bivens | 267/34 |
| 5,697,477 | 12/1997 | Hiramoto et al. | 188/322.18 |
| 5,713,623 | 2/1998 | Mattingly | 296/37.7 |

*Primary Examiner*—Chris Schwartz
(74) *Attorney, Agent, or Firm*—Pitney, Hardin, Kipp and Szuch LLP

(57) ABSTRACT

The air damper includes a housing with cylindrical walls and a piston assembly reciprocating therein. The piston assembly includes an interior surface against which a seal abuts. The interior surface is textured in a grained pattern so that interstices are formed between the seal and the interior surface thereby forming an effective air passageway for damping. A cylindrical spacer spaces the interior surface from a retainer and the seal is engaged around the cylindrical spacer and between the retainer and the interior surface. An alternative embodiment inserts textile material through a damping orifice in order to vary the rate of damping.

10 Claims, 3 Drawing Sheets

AIR DAMPER WITH ADJUSTABLE AIR FLOW RATE

BACKGROUND OF THE INVENTION

1. Field of the Invention

The present invention pertains to air dampers with adjustable air flow rates. The adjustable air flow rates are achieved by the degree of graining or texturing of a plate which contacts the seal or by inserting a mold or assembling a media, such as a filter into a shaft or housing of the damper.

2. Description of the Prior Art

In the prior art, air dampers are known. However, typical prior art air dampers do not allow for simple adjustment of the air flow rate which controls the damping. As the damping is typically controlled by an orifice through which the air flows, such adjustment is typically done by varying the size of the orifice which requires a re-design of the air damper.

The damping rate of prior art dampers can be limited due to tooling restrictions, and tooling variations can create damping variations. Similarly, slow damping rates are difficult to achieve with prior art designs. Likewise, small variations in damping rates are difficult to achieve with prior art designs.

Examples of prior art include U.S. Pat. No. 5,603,574 entitled "Fluid Dampened Support Having Variable Stiffness and Damping", issued on Feb. 18, 1997 to Ide et al. which discloses a fluid dampened support having variable stiffness and damping. Electric discharge machining is used for the purpose of achieving fine tolerances. U.S. Pat. No. 5,697,477 entitled "Air Damper", issued on Dec. 16, 1997 to Hiramoto et al. discloses an air damper with a tapered functional damper with a plunger and a piston, and further discloses a cylindrical tapered body and an O-ring resulting in two separate chambers. U.S. Pat. No. 5,647,578 entitled "Latch Mechanism", issued on Jul. 15, 1997 to Bivens discloses a latch mechanism with an O-ring with a tapered surface. U.S. Pat. No. 4,877,155 entitled "Spill Protecting Apparatus", issued on Oct. 31, 1989 to Tull discloses an apparatus which includes an air damper which includes a seal at an open end of the cylinder and compressed gas in two chambers so that both air and friction retard or damp movement of the piston.

OBJECTS AND SUMMARY OF THE INVENTION

It is therefore an object of the present invention to provide an air damper in which the damping rate can be varied without the need for a substantial re-design of the air damper.

It is therefore a further object of this invention to provide an air damper in which slow damping rates can be achieved.

It is therefore a still further object of this invention to provide an air damper in which damping rates are repeatable from damper to damper.

It is therefore a still further object of this invention to provide an air damper in which small changes in damping rates can be achieved.

It is therefore a still further object of the present invention to provide an air damper in which the damping rate can be varied with a minimal additional cost.

These and other objects are attained by providing an air damper in which the damping is effected by air passing between a seal and a textured or grained plate within the plunger. By varying the depth and/or degree of texturing or graining, the effective air flow area can be varied thereby varying the degree of damping. Alternatively, a mold can be inserted or a media, such as a filter, can be assembled into a shaft or housing of a damper in order to vary the amount of air flow.

More particularly, the air damper includes a shaft, a seal, a housing, a retainer and a plunger, the plunger having the textured surface. In operation, when the damper is extended, the seal extends between the outer diameter of the seal and the inner diameter of the housing and between the top grained surface of the plunger and the bottom wall of the seal. The grained surface on the plunger allows a very accurately controlled amount of air to be metered from one side of the seal to the other, thereby causing a slow consist damped rate. This airflow rate can be varied by simply changing the grained finish. These variations in airflow rate can be small or large and are very repeatable from one damper to another.

BRIEF DESCRIPTION OF THE DRAWINGS

Further objects and advantages of the invention will become apparent from the following description and claims, and from the accompanying drawings, wherein:

FIG. 1 illustrates in phantom a filter media which can be inserted in the second embodiment of the air damper of the present invention.

DETAILED DESCRIPTION OF THE PREFERRED EMBODIMENT

Figure 1:
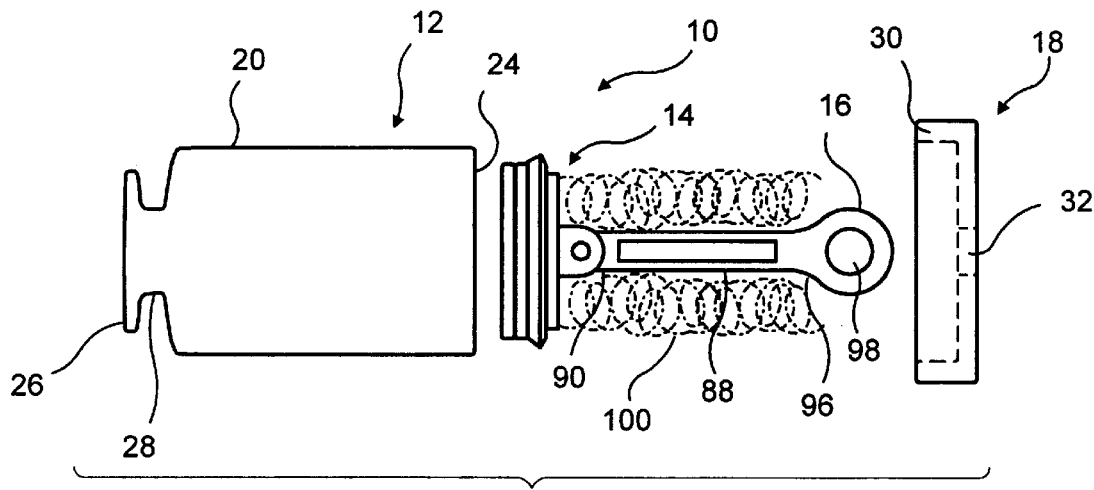
FIG. 1 is a partially exploded plan view of the housing and piston of the first embodiment of the air damper of the present invention. Additionally.

Referring now to the drawings in detail, one sees that FIG. 1 is a partially exploded side plan view of air damper 10 of the first embodiment of the present invention, showing the housing 12 receiving the piston assembly 14 attached to shaft 16, and further receiving cap 18, through which shaft 16 reciprocates. Textile material 100 is illustrated in phantom, but is not envisioned as part of the first embodiment, but rather in the second embodiment as described hereinafter.

Figure 2:
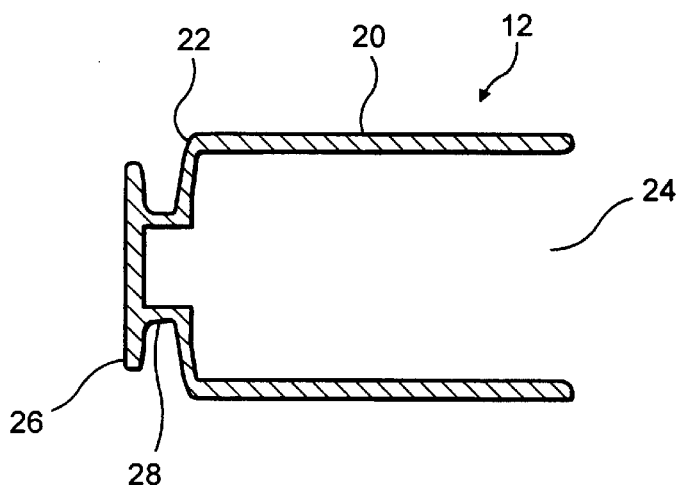
FIG. 2 is a cross-sectional view of the housing of the air damper of the present invention.

As shown in FIG. 2, housing 12 includes cylindrical walls 20 with closed end 22 and chamfered mouth 24. Closed end 22 includes cylindrical flange 26 extending from area of reduced diameter 28 in order to provide an attachment element to a structural element such as a refrigerator or freezer (not shown). Those skilled in the art will realize that such an air damper is useful in many different applications.

As shown in FIG. 1, cap 18 includes lip 30 for engaging chamfered mouth 24 of housing 12 and further includes central aperture 32 through which shaft 16 reciprocates. Cap 18 prevents piston assembly 14 from being withdrawn from housing 10 during operation.

Figure 3:
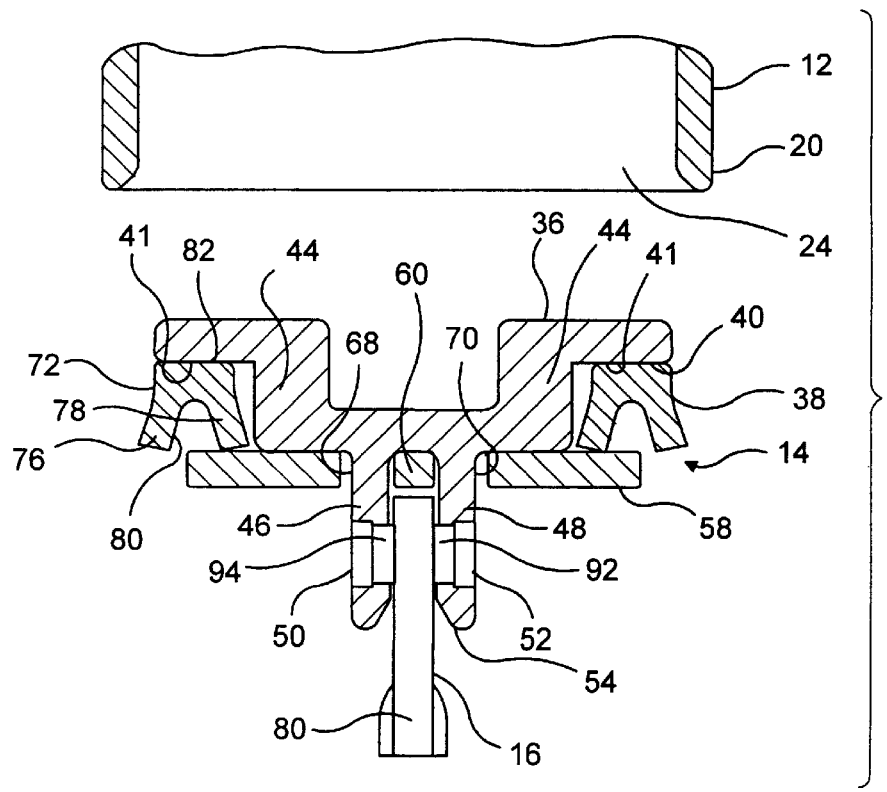
FIG. 3 is a cross-sectional view of the piston of the first embodiment of the air damper of the present invention.
Figure 4:
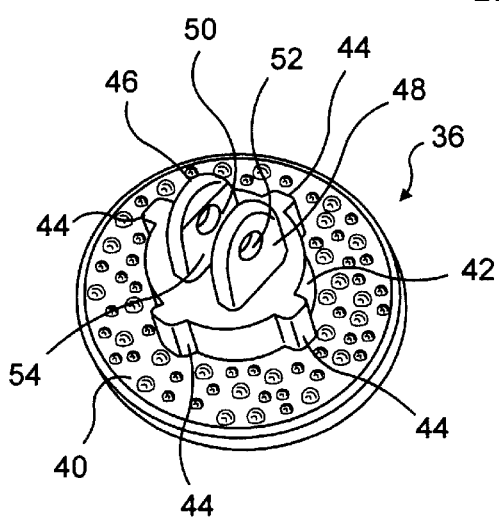
FIG. 4 is a perspective view of the plunger of the first embodiment of the air damper of the present invention.
Figure 5:
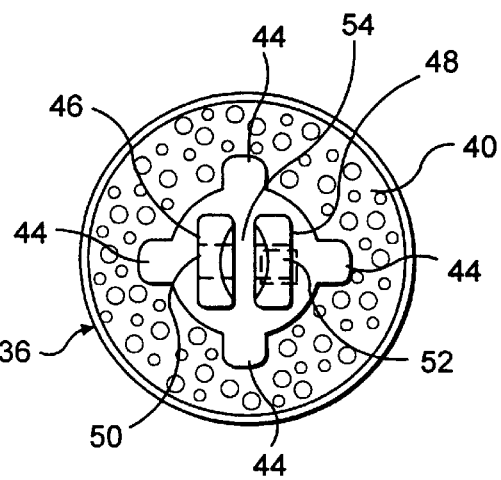
FIG. 5 is a top view of the plunger of the first embodiment of the air damper of the present invention.
Figure 6:
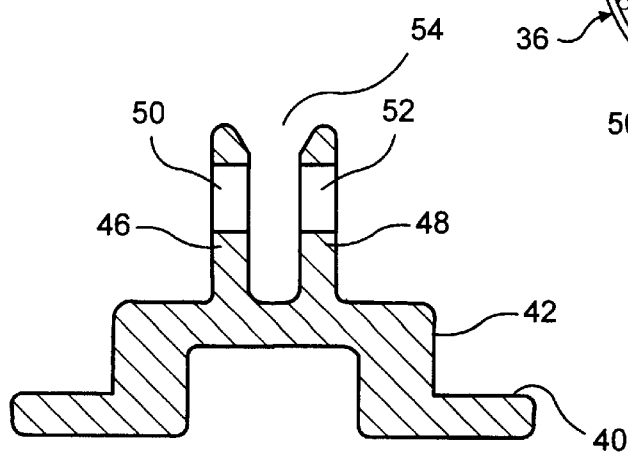
FIG. 6 is a cross-sectional view of the plunger of the first embodiment of the air damper of the present invention along plane 6—6 of FIG. 5.

As shown in FIG. 3, piston assembly 14 includes plunger 36, seal 38 and retainer 58. As further shown in FIGS. 4, 5 and 6, plunger 36 includes lower toroidal plate 40 and central cylindrical longitudinal spacer 42 with radially extending spacer ribs 44. Parallel attachment tabs 46, 48 extend from central cylindrical longitudinal spacer 42 and include apertures 50, 52, respectively, and form gap 54 therebetween.

Grained surface 41 of lower toroidal plate 40 is radially outward from central cylindrical longitudinal spacer 42 and includes a grained or textured surface wherein portions of the surface deviate from planar. As will be described hereinafter, these deviations form interstices between grained surface 41 and seal 76 thereby forming the effective air passageway for the damper 10 and variations of the degree of these deviations can vary the effective area of the air passageway thereby varying the damping strength, possibly over a very small gradation, in a very predictable and repeatable manner.

Figure 8:
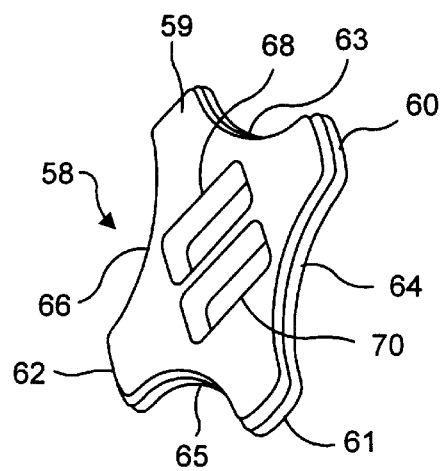
FIG. 8 is a perspective view of the retainer of the first embodiment of the air damper of the present invention.

As shown in FIG. 8, retainer 58 is generally planar and includes four outwardly extending portions 59, 60, 61, 62 alternating with concave portions 63, 64, 65, 66. Parallel guide slots 68, 70 are formed at a central location of retainer 58 with isthmus 60 formed therebetween. As shown in FIG. 3, during assembly, parallel attachment tabs 46, 48 of plunger 36 extend through parallel guide slots 68, 70 and isthmus 60 extends through gap 54. As retainer 58 is longitudinally spaced from lower toroidal plate 40 by central cylindrical longitudinal spacer 42, toroidal gap 72 is formed to engage seal 76. Seal 76 is further internally radially engaged or positioned by radially extending spacer ribs 44.

Figure 7:
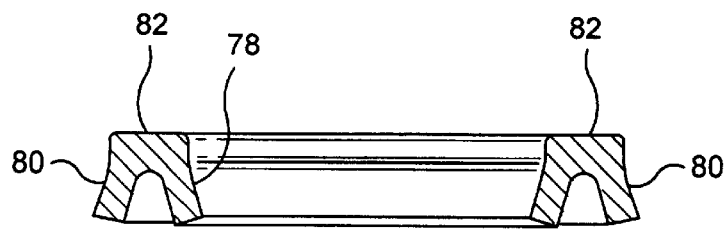
FIG. 7 is a side cross-sectional view of the seal of the first embodiment of the air damper of the present invention.

As shown in FIGS. 3 and 7, seal 76 is generally toroidal with radially inward wall 78 and radially outward wall 80 facing generally downward in the illustrated orientations, or toward chamfered mouth 24 of housing 12 after insertion of piston assembly 14 into housing 12. Radial wall 82 extends between radially inward wall 78 and radially outward wall 80. Radial wall 82 further urges against grained surface 41 of lower toroidal plate 40. As grained surface 41 includes portions which deviate from planar, interstices are formed between grained surface 41 and radial wall 82 of seal 76 which form the effective air passageway for the damping function of damper 10. This air passageway provides communication between the chamber within the housing 12 as bounded by the piston assembly 14 and closed end 22 and the chamber of essentially atmospheric pressure formed between piston assembly 14 and mouth 24 of housing 12. Increases in these deviations resulting from increased graining or increased texturing increase the interstices and likewise increase the effective area of the air passageway thereby varying the damping of damper 10.

Figure 9:
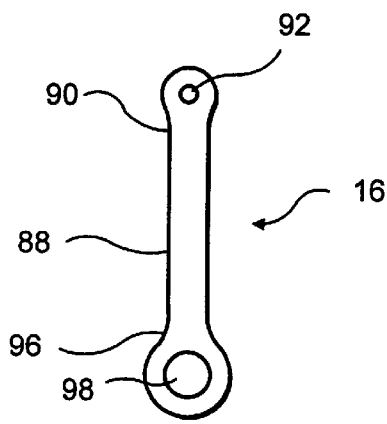
FIG. 9 is a side plan view of the shaft of the first embodiment of the air damper of the present invention.

As shown in FIG. 9, shaft 16 includes a generally cylindrical central portion 88 with first end 90 including radially outwardly extending cylindrical bosses 92, 94 which, as shown in FIG. 3, engage apertures 50, 52 of parallel attachment tabs 46, 48 of plunger 36. Second end 96 of shaft 16 includes attachment element 98 which typically attaches to a door or similar structural element (not shown).

A second embodiment of air damper 10 is taught by the textile material 100 shown in phantom in FIG. 1. Typically, this second embodiment does not require the piston assembly structure taught hereinabove but would typically involve a structure as disclosed in more detail in U.S. patent application Ser. No. 09/177,029, entitled "Silent Damper with Anti-Rattle Shaft", filed on Oct. 22, 1998, the disclosure of which is hereby incorporated by reference. The textile material 100, such as a filter or GORE® material, extends through the damping orifice of the piston thereby effectively increasing the air flow resistance thereby increasing the damping. This textile material 100 can be increased or decreased by fine increments to vary the strength of the damping and obviously does not add substantially to the costs of the damper.

Figures 10, 11:
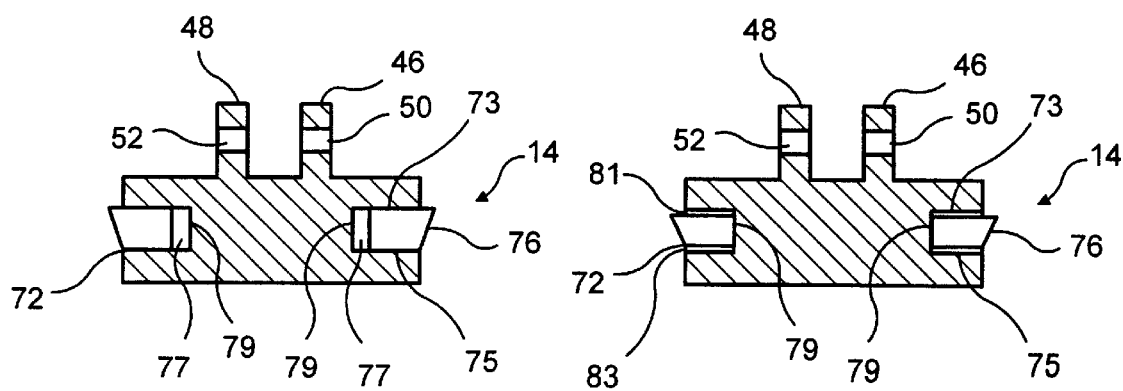
FIG. 10 is a cross-sectional view of the first alternative piston assembly of the present invention.
FIG. 11 is a cross-sectional view of the second alternative piston assembly of the present invention.

First and second alternative embodiments of piston assembly 14 are disclosed in FIGS. 10 and 11. Piston assembly 14 includes parallel attachment tabs 46, 48 with apertures 50, 52 similar to those disclosed in FIG. 3. However, piston assembly 14 is a relatively unitary piece with toroidal channel 72 formed therein to engage seal 76. In FIG. 10, the upper and lower radially oriented toroidal surfaces 73, 75 are grained or textured to provide the interstices as described hereinabove and are urged against seal 76. In FIG. 10, gap 77 is formed between inner cylindrical wall 79 to provide an air passageway. In FIG. 11, similarly, inner cylindrical wall 79 includes the grained or textured surface to provide the interstices described hereinabove and is urged against seal 76. There is "play", however, between upper and lower radially oriented surface 73, 75 and inner cylindrical wall 79, illustrated as gaps 81, 83, in order to provide an air passageway.

In order to use damper 10, the installer may be supplied with an assembled damper 10, or may have the choice of various seals 76 and various plungers 36 with different degrees of texturing or graining. The installer would assemble the damper 10 with the various desired elements as taught above and typically attach cylindrical flange 26 to a fixed structure, such as a refrigerator or freezer body, and would attach attachment element 98 of shaft 16 to a moveable structure, such as a door of a refrigerator or freezer body.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. An air damper comprising:
    a housing;
    a piston reciprocating within said housing;
    said piston including a seal engaging an interior wall of said housing during reciprocation;
    said seal being engaged by an interior surface of said piston;
    said interior surface of said piston including variations from a planar surface thereby forming irregular interstices between said interior surface and said seal thereby forming an air passageway between said piston and said seal.

2. The air damper of claim 1 wherein said variations from a planar surface on said interior surface are formed by irregular texturing of said interior surface.

3. The air damper of claim 2 wherein texturing of said interior surface further includes graining.

4. The air damper of claim 3 wherein said piston includes a plunger with a cylindrical spacer extending from said interior surface, said seal being positioned outwardly radially adjacent from said cylindrical spacer.

5. The air damper of claim 4 wherein said cylindrical spacer further includes radially extending ribs abutting said seal.

6. The air damper of claim 5 further including a piston shaft, and wherein tabs extend longitudinally from said cylindrical spacer, said tabs including an attachment element for attaching to said piston shaft.

7. The air damper of claim 6 further including a retainer with slots through which said tabs extend, said retainer being spaced parallel to said interior surface by said cylindrical surface, said seal being positioned between said retainer and said interior surface.

8. The air damper of claim 1 wherein said interior surface includes an inner cylindrical surface.

9. The air damper of claim 1 wherein said interior surface includes at least one radially oriented toroidal surface.

10. An air damper including:

a housing;

a piston reciprocating within said housing;

said piston including an an air passageway providing communication from a first side of said piston to a second side of said piston; and textile material inserted through said air passageway thereby varying the air flow resistance through said air passageway.

* * * * *